United States Patent [19]
Roche

[11] Patent Number: 5,609,440
[45] Date of Patent: Mar. 11, 1997

[54] APPARATUS AND METHOD FOR ARRESTING THE PROPAGATION OF A BUCKLE IN A PIPELINE

[75] Inventor: Joseph R. Roche, Kingwood, Tex.

[73] Assignee: Hydril Company, Houston, Tex.

[21] Appl. No.: 490,057

[22] Filed: Jun. 16, 1995

[51] Int. Cl.$^6$ .......................... F16L 1/0012; F16L 25/00
[52] U.S. Cl. ........................ 405/158; 405/168.2; 285/330
[58] Field of Search ............................... 405/158, 168.2, 405/168.3; 285/330, 334, 334.2

[56] References Cited

U.S. PATENT DOCUMENTS

| | | | |
|---|---|---|---|
| Re. 30,647 | 6/1981 | Blose | 285/332.2 |
| Re. 34,467 | 12/1993 | Reeves | 285/334 |
| 1,781,091 | 11/1930 | Wilson | 285/175 |
| 3,747,356 | 7/1973 | Lochridge et al. | 61/72.3 |
| 4,300,598 | 11/1981 | Royer et al. | 138/177 |
| 4,364,692 | 12/1982 | Kyriakides et al. | 405/168 |
| 4,421,437 | 12/1983 | Langner | 405/166 |
| 4,449,852 | 5/1984 | Muszynski | 405/168 |
| 4,572,549 | 2/1986 | Sidwell | 285/39 |
| 4,629,224 | 12/1986 | Landriault | 285/334 |

*Primary Examiner*—Stephen J. Novosad
*Assistant Examiner*—Tara L. Mayo
*Attorney, Agent, or Firm*—Vaden, Eickenroht & Thompson, L.L.P.

[57] ABSTRACT

An underwater pipeline is disclosed that arrests the propagation of a collapse or buckle that may occur as the pipeline is being laid or after the pipeline is in service. The pipeline comprises a plurality of joints of pipe connected end-to-end by a threaded connection. Each connection includes external cylindrical threads of opposite hand on adjacent ends of the pipe joints. A coupling having right and left-hand threads for moving the ends of the pipe joints into abutting position in sealing engagement with a seal ring to seal the connection. The connection provides a physical discontinuity in the pipeline to stop the propagation of a buckle in the pipeline. Additionally, by virtue of the thread profile, the coupling may provide radial support to the pin members to resist collapse.

6 Claims, 1 Drawing Sheet

APPARATUS AND METHOD FOR ARRESTING THE PROPAGATION OF A BUCKLE IN A PIPELINE

This invention relates to an apparatus for arresting the propagation of a buckle or collapse along a pipeline, generally, and in particular to a threaded connection for connecting the joints of pipe in a pipeline that also serves to arrest a buckle traveling along a pipeline as the pipeline is being laid on the bottom of a body of water and after the pipeline is in service.

There are generally two systems for laying a segmented underwater pipeline, the S-lay system and the J-lay system. The S-lay system employs a lay barge, LB, as shown in FIG. 1. In this system the joints of pipe are connected in a generally horizontal position. As the connected joints enter the water, they are supported by stinger 12, which allows the pipe to turn from a generally horizontal position to a generally vertical position without being subjected to excessive bending stresses. The pipe then bends in one direction as it enters the water and in the opposite direction as it moves toward engagement with the bottom, hence the name S-lay system.

The J-lay system is shown in FIG. 2. It employs a floating drilling rig, multi-service vessel, or barge, DB, where the pipe is connected in a vertical position and then lowered directly to the bottom of the water with the pipe generally following a J-shaped curve.

During the time the pipeline is being laid on the bottom of a body of water, it typically contains air at atmospheric pressure and is more susceptible to the hydrostatic pressure of the water than it would be when it is in operation and containing fluids under pressure to help support the walls of the pipe against collapse from the hydrostatic pressure. So during this laying procedure, if the lay barge or drilling rig gets too far ahead of the point of engagement or moves too close to a position above the point of engagement of the pipe with the bottom, excessive local stress may be induced in the pipe that could collapse or buckle the wall of the pipe. That, combined with the hydrostatic head of the sea, will cause the buckle to begin to propagate along the pipe in either or both directions until it is stopped by some type of buckle arrester or other physical discontinuity.

Once in service, a deep water pipeline may experience collapse or buckling induced by external or corrosive damage and/or by insufficient internal pressure.

Various buckle arresters have been proposed. In U.S. Pat. No. 3,747,356 to Lochridge et al., a method of limiting the distance a buckle travels was proposed that included having a lay barge pull a buckle-resisting pig in the pipeline with the pig located at about the point where the pipeline engages the bottom of the water. With this arrangement, of course, the line attached to the pig would have to be threaded through each successive joint of pipe as it is added to the pipeline.

In U.S. Pat. No. 4,300,598, it is proposed to insert a stiffening member at various intervals along the pipeline having a substantially larger wall thickness than the pipe to limit the travel of a buckle along the pipeline. The stiffening member is welded to the ends of adjacent pipes. The ends of adjacent pipe joints could be externally upset to increase the wall thickness before welding the ends together to obtain the same result.

In U.S. Pat. No. 4,364,692, it was proposed to wrap a rod tightly around the pipe at spaced intervals to act as buckle arresters. This pipe arrester system was specifically designed to be installed on pipe as it is paid off a reel upon which the pipe has been wound.

U.S. Pat. No. 4,421,437 suggests that collapse failure of a pipe wall can be prevented from propagating along an underwater pipeline by providing corrugations at intermittent, recurrent, or periodic intervals along the length of the pipeline. It is suggested that the corrugated interval or section can be formed in situ in the pipe when the pipe is manufactured.

A pipeline buckle arrester or preventer is described in U.S. Pat. No. 4,449,852 that consists of a fiber-reinforced resin cover secured to at least a portion of the outside of the pipeline and a polymer-concrete formulation encapsuling the resin cover.

U.S. Pat. No. 4,572,549 to Sidwell discloses a combination connector/buckle arrester which in addition to connecting pipeline sections resists the propagation of a buckle along the pipeline. The connector like the connector of this invention is also a threaded connector. Sidwell's connector is constructed like a tool joint. It has a box and pin that are welded to the ends of the pipe to be connected. The box and pin are made with walls that are substantially thicker than the pipe. The connection also requires rotation of one joint of pipe relative to the other in order to make up the connection.

All of the buckle arresters described in the patents discussed above with the exception of the '692 patent and the '549 patent are to be used with pipelines made up of joints of pipe welded together. The buckle arrester of the '692 patent was designed primarily for coiled pipe although it could be used on a welded line. The '549 patent is a box and pin threaded connection but requires welding the box and pin on the ends of the pipe joints to be connected.

Usually, the J-lay system is typically more advantageous for laying a large diameter pipeline in deep water. The upper end of the pipeline is supported in a vertical position so that the pipe does not experience high levels of combined tension/bending. Hence, the stress in the pipe is lower for equivalent water depths. The connections are made with the pipe vertical. Threaded connections can be made up faster than the ends of the pipe can be welded, which saves time and money. The horizontal projection of the unsupported pipe span is also shorter for J-lay than for S-lay.

It is therefore an object of this invention to provide a threaded connection for connecting joints of pipe to form a pipeline that does not require relative rotation of the joints being connected and that creates a discontinuity in the pipeline that will arrest a buckle traveling down the pipe to the connection.

It is another advantage and object of this invention to provide a buckle arresting connection between the ends of two joints of pipe in a pipeline that is connected and held together by an external coupling that is rotated relative to both joints of pipe to make up the connection thereby eliminating the need to rotate one joint relative to the other to make up the connection.

It is another object and advantage of this invention to provide such a connection with hooked or wedge type threads so that for the buckle to propagate past the connection, the coupling must inelastically deform along with the threaded end of the pipe or pull the male threads out of the female threads.

These and other objects, advantages, and features of this invention will be apparent to those skilled in the art from a consideration of this specification including the attached drawings and appended claims.

IN THE DRAWINGS

Figure 1:
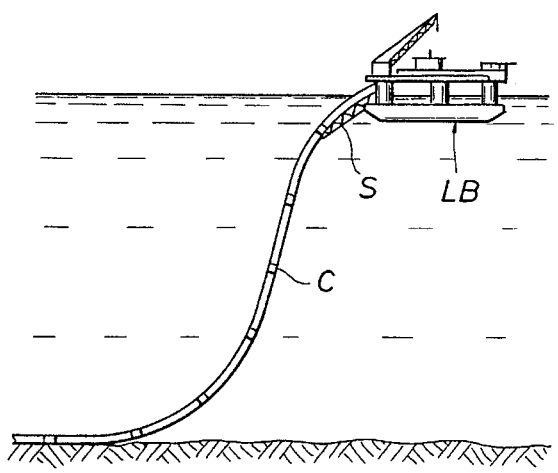
FIGS. 1 and 2 are discussed above in explaining the S-lay and the J-lay systems of laying an underwater pipeline.
Figure 2:
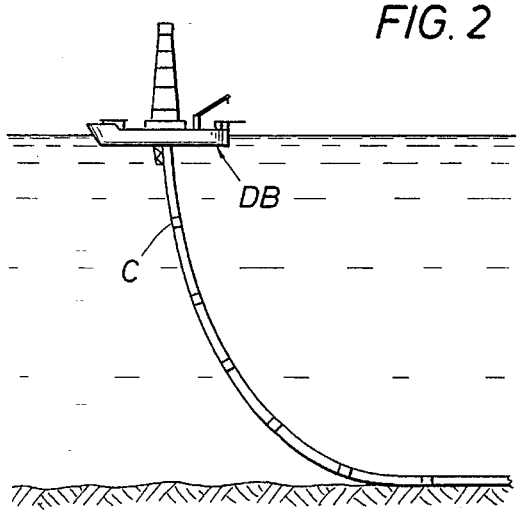

Threaded pin members 10 and 12 are provided with two step, right-hand and left-hand threads 14 and 16. Coupling 18 has mating two step threads 20 and 22 on opposite sides of the center line of the coupling that mate with threads 14 and 16 on the pin members 10 and 12. When the coupling is made up on the pin members, means are provided to prevent relative rotation between the pin members. In the embodiment shown, the ends of the pin members have lugs 24 and grooves 26 that mate when the connection is made up as shown in FIG. 3 and prevent relative rotation of the pin members.

Generally, the connection will be made up by initially stabbing both pin members into the coupling, aligning them in accordance with indicia on the pin members, fixing them to prevent rotation, and rotating the coupling to final makeup. All this is easily performed using ordinary oilfield tools.

Figure 3:
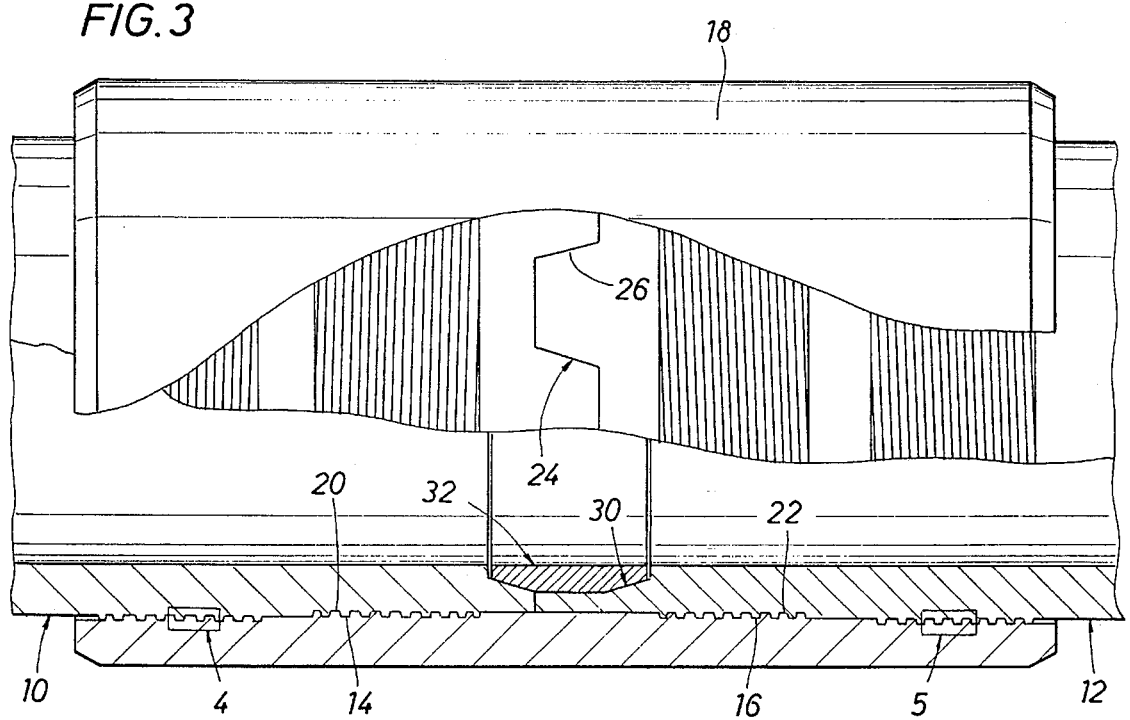
FIG. 3 is a partial sectional view through the connection of this invention fully made up with the ends of the pipe forming a cavity for engaging and activating the internal seal ring that prevents fluid from leaking from the connection.

As shown in FIG. 3, the abutting ends of the pin members are machined to form cavity 30 to receive and energize annular seal member 32 when the connection is made up.

Figure 4:
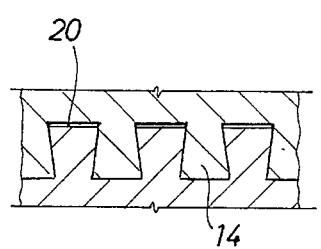
FIGS. 4 and 5 are exploded views of the wedge-shaped and hooked threads, respectively, shown in FIG. 3 that can be used advantageously with this connection.
Figure 5:
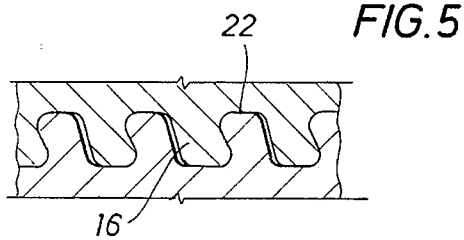

FIGS. 4 and 5 illustrate two types of threads that can be used to lock the pin members and the coupling together. The threads of FIG. 4 are wedge threads, i.e., the threads on the pin increase in width in one direction and the threads on the pin coupling increase in width in the other direction. As a result, when the connection is made up, the collapsing force of a buckle is resisted not only by the hoop strength of the pin member but also, because of the radial support from the interlocked threads, by the resistance of the coupling to the collapsing force.

FIG. 5 shows hooked threads that combine with engaging shoulders, such as the engaging ends of the pin members to transmit any collapsing force on the pin members to the coupling.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. An underwater pipeline that is resistant to collapse by a propagating buckle that may occur as the pipeline is being laid in deep water, said pipeline comprising a plurality of joints of pipe connected by threaded connections, each connection including external cylindrical threads of opposite hand on adjacent ends of each of said plurality of pipe joints, and a coupling having right and left-hand cylindrical threads for moving the ends of the pipe joints into abutting position, the abutting ends providing a physical discontinuity between the ends of the pipe joints, and each of said threaded connections including means to stop the propagation of a buckle or collapse in the pipeline, and a seal ring to seal the connection.

2. The underwater pipeline of claim 1 in which said means to stop the propagation of a buckle or collapse are hooked threads.

3. The underwater pipeline of claim 1 in which said means to stop the propagation of a buckle or collapse are wedge-shaped threads.

4. A method of preventing the propagation of a buckle in a pipeline made up of a plurality of joints of pipe connected together as the pipeline is being laid on the bottom of a deep body of water comprising providing the ends of the pipe joints with cylindrical threads and connecting the pipe joints together to form a pipeline using couplings having threads of opposite hand so that a buckle that forms in one of the pipe joints as the connected joints are being lowered to the bottom of the body of water will travel only until it reaches a threaded connection.

5. The method of claim 4 in which the buckle collapses the threaded end of the pipe joint but not the coupling to stop the buckle from propagating past the threaded connection.

6. The method of claim 4 in which the coupling and threaded ends of the pipe joints are provided with interlocking threads that force the buckle to collapse the coupling and the end of the pipe to continue past the connection.

\* \* \* \* \*